Sept. 21, 1926.

H. SPURRIER 1,600,493

MEANS FOR TREATING CERAMIC MIXTURES

Filed March 6, 1926         2 Sheets-Sheet 1

Witness:
R. Burkhardt

Inventor:
Harry Spurrer,
By Wilkinson, Huxley, Byron & Knight
Attys

Sept. 21, 1926.
H. SPURRIER
1,600,493
MEANS FOR TREATING CERAMIC MIXTURES
Filed March 6, 1926    2 Sheets-Sheet 2
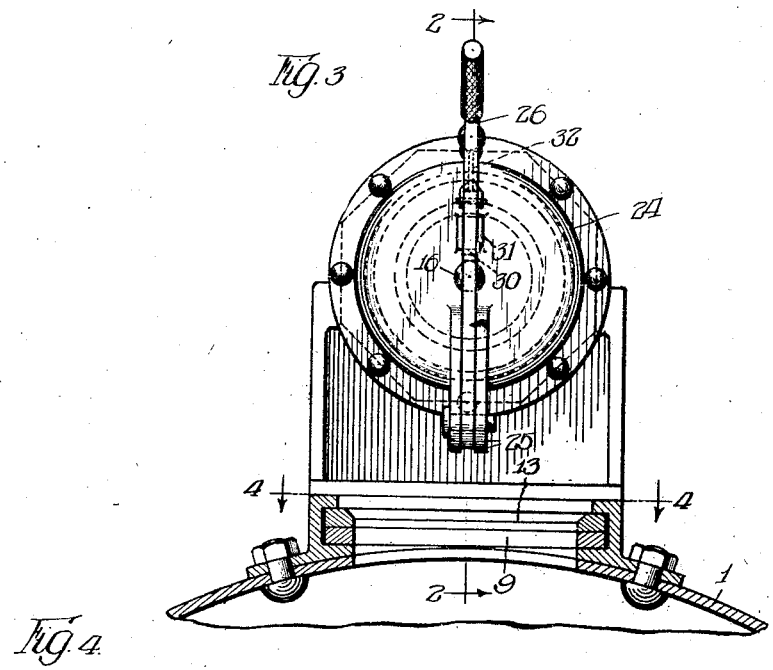
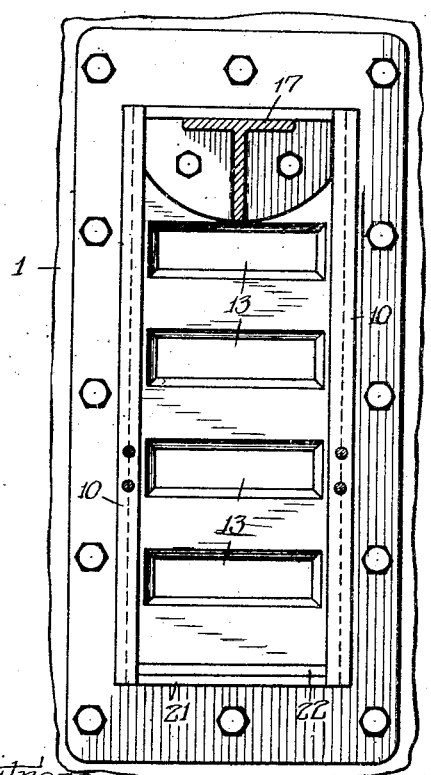
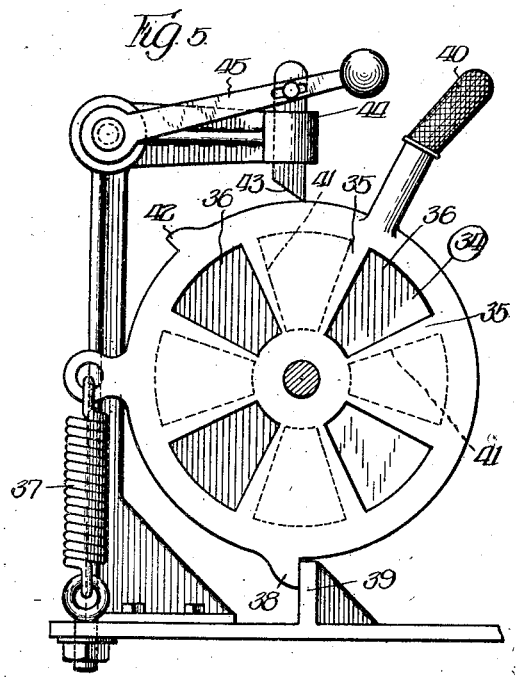
Inventor:
Harry Spurrier, Patented Sept. 21, 1926.

1,600,493

UNITED STATES PATENT OFFICE.

HARRY SPURRIER, OF CHICAGO, ILLINOIS, ASSIGNOR TO NORTHWESTERN TERRA COTTA COMPANY, OF CHICAGO, ILLINOIS, A CORPORATION OF ILLINOIS.

MEANS FOR TREATING CERAMIC MIXTURES.

Application filed March 6, 1926. Serial No. 92,788.

The present invention relates to means for treating ceramic mixtures.

More particularly the present invention relates to improved means for carrying out the process described in United States Letters Patent No. 1,559,652, granted November 3, 1925, to the present applicant. According to said process, a ceramic mixture is subjected to reduced air pressure, commonly referred to as a vacuum, and the vacuum is suddenly broken, whereby to effect the elimination of gases from said mass.

An object of the present invention is to provide an improved means for suddenly opening a vessel whereby to admit air thereto with suddenness and in large quantities.

A further object is to provide an improved vessel adapted to contain a mass of ceramic material, which vessel is provided with means for evacuating the air therefrom and with means for suddenly breaking the vacuum within said vessel.

Further objects will appear as the description proceeds.

Referring to the drawings—

Figure 3 is an end view of the structure shown in Figures 1 and 2;

Figure 4 is a sectional view taken along the plane indicated by the arrows 4—4 of Figure 3; and Figure 5 is a view of a modified form of valve.

Figure 1:
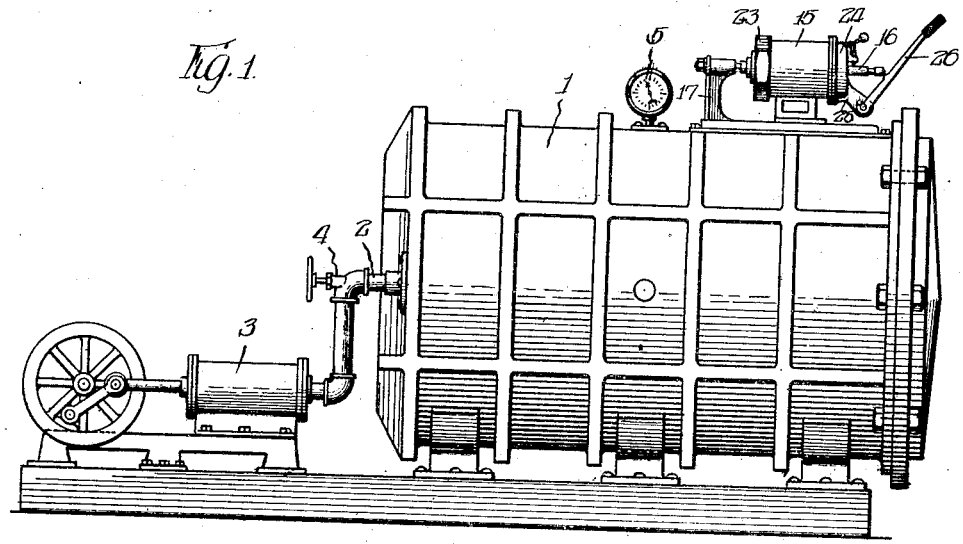
Figure 1 is a view in side elevation of one embodiment of the present invention.

The numeral 1 indicates a vessel adapted to contain ceramic materials. Said vessel is provided with the evacuating pipe 2, which is connected to the vacuum pump 3, the manually operable valve 4 being provided to control the connection between said pipe 3 and said cylinder 1. A pressure gauge 5 may be provided for indicating the pressure within said cylinder 1.

The cylinder 1 is provided on its upper portion with an aperture, indicated by the numeral 6, above which aperture is mounted the valve seat 7, comprising a plurality of bridges 8—8 spaced apart by spaces 9—9. Upstanding portions 10 provide guideways for the sliding valve 11. Said sliding valve 11 is provided with bridge members 12—12 spaced apart by apertures 13, which bridge members 12—12 and apertures 13—13 may be of a size corresponding, respectively, to the bridge members 8—8 and apertures 9—9 of the valve seat 7, the bridge members being preferably a little wider than the apertures. When the valve 11 is in one selectable position, the bridge members 12—12 thereof will bridge the apertures 9—9 of the valve seat to close the cylinder 1 from access to the atmosphere. When the valve 11 is in another selectable position, that is—the position indicated in Figure 2, the apertures 13—13 of said valve 11 will coincide with the apertures 9—9 of the valve seat 7, and ready access is had between the interior of the cylinder 1 and the outside atmosphere.

For controlling said valve 11 in order that said valve may open with a snap action, a spring operated device is provided, which is indicated as a whole by the numeral 14. Said controlling device 14 comprises a housing 15, which may be mounted in any preferred way upon the top of the cylinder 1, as, for example, upon the guideways 10, being secured by means of screws 15ª—15ª. Said housing has mounted therein the plunger 16, which plunger is connected at one of its extremities to the bracket 17, connected to the valve 11 as, for example, by means of cap screws, one of which is indicated by the numeral 17ª. Secured intermediate of the plunger 16 is the abutment member 18, which is adjustable relative to the length of the plunger 16, a setscrew 19 being provided to hold said abutment member 18 in adjusted position. A compression spring 20 is provided between the end wall of the housing 15 and said abutment member 18, whereby to bias said plunger toward the right as the parts are viewed in Figure 2. Expressed in other language, the spring 20 biases the parts to the position shown in Figure 2, in which the apertures 13—13 of the valve 11 coincide with the apertures 9—9 of the valve seat 7. A bracket 21 and filler plate 22 serve to limit movement of the valve 11 toward the right.

Both end walls of the housing 15 are preferably removable, the end wall 23 comprising one abutment for the spring 20 and the other end wall 24 providing pivotal mounting means for the operating lever for controlling said plunger 16 and the detent for controlling said plunger, which parts will now be briefly described. Said end wall 24 is provided with the bracket 25, having pivotally mounted thereon the operating lever 26, which operating lever is adapted to abut against the extremity of the plunger 16. Counterclockwise movement of said lever 26 will result in the movement toward the left of said plunger 16. Clockwise movement of the lever 26 is limited by the shoulder 27 upon said lever and the pin 28 carried by the bracket 25. The plunger 16 is provided with a shoulder 29, near, but spaced from, the right-hand extremity of the plunger 16. Said shoulder 29 is adapted to be engaged by a gravity responsive detent 30 mounted to reciprocate within the bracket 31. Said detent 30 is connected by means of the link 32 with the weighted lever 33.

It will be clear that when the lever 26 is moved in a counterclockwise direction the plunger 16 will be moved to the left, compressing the spring 20 and moving the valve 11 toward the left. When the bridge members 12—12 of the valve 11 are in position to cover the apertures 9—9 of the valve seat 7, the shoulder 29 of the plunger 16 will be in position to be engaged by the detent 30, whereby said detent will hold said parts in said position to cut off communication from the interior of the vessel 1 to the outside atmosphere.

Figure 2:
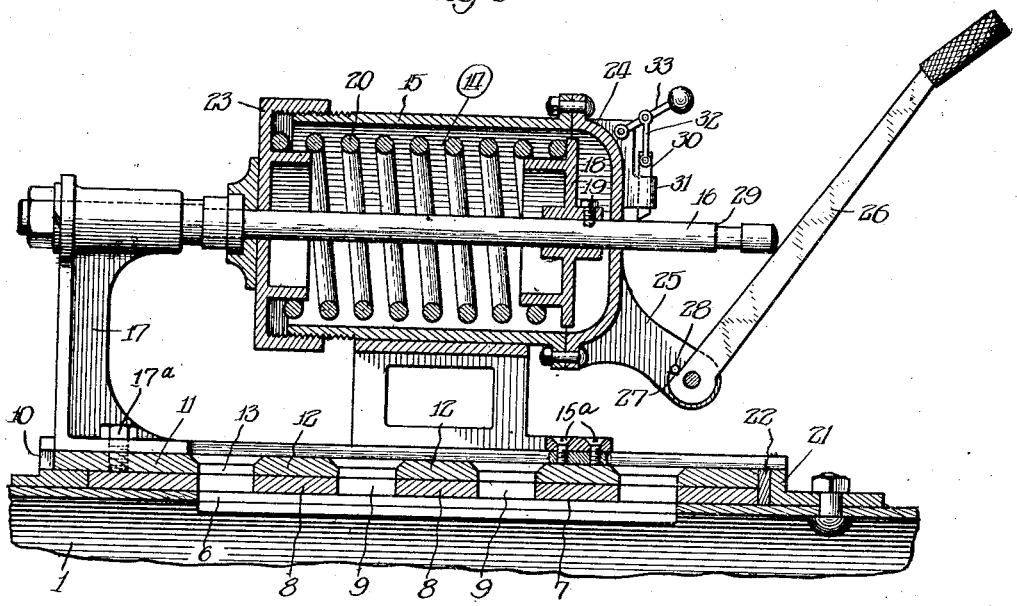
Figure 2 is a sectional view, on an enlarged scale, of part of the structure shown in Figure 1, which view shows a novel type of air inlet valve and control means therefor, said sectional view being taken along the plane indicated by the arrows 2—2 of Figure 3.

When it is desired to admit air suddenly to the vessel 1, the lever 33 may be lifted whereby to free the detent 30 from the shoulder 29, after which the spring 20 will move the plunger 16 and valve 12 suddenly to the right to the position shown in Figure 2, with the right-hand end of said valve abutting against the plate 22.

According to the modification shown in Figure 5, a rotary valve is provided which may be mounted upon a wall of the vessel 1. The modification shown in Figure 5 includes the rotary valve 34, having the bridging members 35—35, which are separated by the apertures 36—36. Said bridging members 35 are adapted to close apertures in the wall of the vessel 1 when said valve is in one selectable position, and to permit access through said apertures when said valve is in another selectable position. A tension spring 37 biases said rotary valve 34 in a counterclockwise direction, the movement of said valve being limited by reason of the engagement of a shoulder 38 on said valve with an abutment 39.

A handle 40 is provided for permitting rotation of said valve 34 in a clockwise direction. When the valve is in the position indicated by the dotted lines 41, access is cut off between the outside atmosphere and the interior of the cylinder 1. In order to hold the rotary valve 34 in the position to close access to the interior of the cylinder 1, a shoulder 42 is provided, adapted to be engaged by a detent 43 which is adapted to reciprocate in a bracket 44. A weighted lever 45 is provided for biasing said detent 43 to its lowermost position and for lifting said detent 43 when desired.

It will be clear that when the structure shown in Figure 5 is being used, the operator may close access to the cylinder 1 by grasping the handle 40 and moving the rotary valve 34 against the tension of the spring 37 to a position wherein the bridging members 35 of said rotary valve prevent access from the outside to the interior of said cylinder 1. At this time the stop 42 will be in position to be engaged by the detent 43 and said rotary valve will be held in closing position by said detent 43. When it is desired to suddenly admit air to the vessel 1, the lever 45 will be raised, whereby the detent 43 is freed from the stop 42. The spring 37 will then rotate the valve 34 with a sudden snap movement to a position wherein the stop 38 abuts against the bracket 39, in which position access of air will be permitted from the outside atmosphere to the interior of the vessel 1.

Though two embodiments of the present invention have been described in detail, it will be clear that many modifications will occur to those skilled in the art. It is intended to cover all such modifications that fall within the scope of the appended claim.

I claim:

Means for treating materials, comprising a vessel, means for evacuating the air from said vessel, and an air controlling means for governing communication between the interior of said vessel and the outside atmosphere, said air controlling means comprising a valve, a spring for biasing said valve to open position, means for moving said valve to closed position in opposition to said spring, and detent means for releasably holding said valve in closed position.

Signed at Chicago, Illinois, this 3rd day of March, 1926.

HARRY SPURRIER.